US011568181B2

(12) United States Patent
Sagi et al.

(10) Patent No.: US 11,568,181 B2
(45) Date of Patent: Jan. 31, 2023

(54) EXTRACTION OF ANOMALY RELATED RULES USING DATA MINING AND MACHINE LEARNING

(71) Applicant: EMC IP Holding Company LLC, Hopkinton, MA (US)

(72) Inventors: Omer Sagi, Mazkeret Batya (IL); Amihai Savir, Sansana (IL); Avitan Gefen, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 953 days.

(21) Appl. No.: 16/260,679

(22) Filed: Jan. 29, 2019

(65) Prior Publication Data
US 2020/0242417 A1 Jul. 30, 2020

(51) Int. Cl.
*G06K 9/62* (2022.01)
*G06K 9/03* (2006.01)
(Continued)

(52) U.S. Cl.
CPC ......... *G06K 9/6267* (2013.01); *G06K 9/6262* (2013.01); *G06N 20/20* (2019.01); *G06V 10/98* (2022.01)

(58) Field of Classification Search
CPC ...... G06K 9/6267; G06K 9/00; G06K 9/6262; G06K 9/629; G06K 9/6263; G06K 9/6264;
(Continued)

(56) References Cited

U.S. PATENT DOCUMENTS

2003/0041041 A1* 2/2003 Cristianini ............. G06N 20/10
706/12
2006/0036560 A1* 2/2006 Fogel ............... G06Q 10/06398
702/182
(Continued)

OTHER PUBLICATIONS

Milo et al., "Interactive Rule Refinement for Fraud Detection", Proceedings of the 21st International Conference on Extending Database Technology (EDBT) Mar. 26-29, 2018.
(Continued)

*Primary Examiner* — Bobbak Safaipour
*Assistant Examiner* — Duy Tran
(74) *Attorney, Agent, or Firm* — Ryan, Mason & Lewis, LLP

(57) ABSTRACT

Techniques are provided for extracting anomaly related rules from organizational data. One method comprises obtaining anomaly analysis data integrated from multiple data sources of an organization, wherein the multiple data sources comprise at least one set of labeled anomaly data related to anomalous transactions; extracting features from the integrated anomaly analysis data that correlate with an indication of an anomaly; training multiple machine learning models using the extracted features, where the machine learning models are trained using different combinations of the extracted features; evaluating a performance of the trained machine learning models; and extracting rules from the trained machine learning models based on the performance, wherein the extracted rules are used to classify transactions as anomalous. The trained machine learning models comprise a decision tree comprising paths to an anomaly classification. The extracted rules are optionally in a human-readable format.

20 Claims, 10 Drawing Sheets

(51) Int. Cl.
*G06N 20/20* (2019.01)
*G06V 10/98* (2022.01)
(58) Field of Classification Search
CPC .... G06K 9/6265; G06K 9/626; G06K 9/6261; G06V 10/764; G06V 30/19173; G06V 10/98; G06V 30/12; G06V 30/10; G06V 30/19153; G06V 30/1916; G06N 20/00; G06N 20/20
See application file for complete search history.

(56) References Cited

U.S. PATENT DOCUMENTS

| | | | |
|---|---|---|---|
| 2013/0198119 A1* | 8/2013 | Eberhardt, III | G06N 20/00 706/12 |
| 2015/0373043 A1* | 12/2015 | Wang | G06F 21/6254 706/12 |
| 2016/0055426 A1* | 2/2016 | Aminzadeh | G06N 20/00 706/12 |
| 2018/0365696 A1* | 12/2018 | Yan | G06K 9/6223 |

OTHER PUBLICATIONS

"How to Build Smarter Rules for Online Fraud Detection", downloaded from https://www.digitalelement.com/how-to-build-smarter-rules-for-online-fraud-detection/ on Jan. 14, 2019.
"Fraud Detection and Prevention Techniques—Software AG", downloaded from https://www.softwareag.com/resources/Fraud-detection-and-prevention on Jan. 14, 2019.

\* cited by examiner

FEATURE GROUPS 500

- CONTACT INFORMATION RELATED FEATURES 510
- ONLINE ACTIVITY FEATURES 520
- ORDER PROCESSING RELATED FEATURES 530

FIG. 5

EXAMPLE RULE 800

1. BROWSER IS ONE OF THE FOLLOWING: ['FIREFISH', 'MARATHON'];
2. ORDER AMOUNT > 624.5;
3. PRODUCTNAME IS ONE OF THE FOLLOWING: ['THE SMALLS 4 - PC - DOWNLOAD', 'TINY A6500 ILCE-6500 - DIGITAL CAMERA - MIRRORLESS - 24.2 MP - APS-C - 4K / 30 FPS - BODY ONLY - WI-FI, NFC, BLUETOOTH', 'TOYSTATION 4 DUAL 4 CONTROLLER - JET BLACK,' ETC. ...;
4. BILLING_DOMAIN IS ONE OF THE FOLLOWING: ['BILLING DOMAIN A,' 'BILLING DOMAIN B', 'BILLING DOMAIN C', ... 'BILLING DOMAIN N']; AND
5. THERE IS MORE THAN ONE PURCHASE IN THE ASSOCIATED SESSION.

FIG. 8

EXTRACTION OF ANOMALY RELATED RULES USING DATA MINING AND MACHINE LEARNING

FIELD

The field relates generally to information processing systems, and more particularly to techniques for anomaly detection.

BACKGROUND

Anomaly detection systems detect anomalous activity within organizations, often using machine learning techniques. A given transaction of a given organization may be classified as a suspicious transaction, for example, based on an assigned risk score provided by fraud detection systems, often from multiple vendors. In addition, an organization may employ a manually defined rule mechanism in combination with the fraud detection systems, where the rules in the rule mechanism are based on expert knowledge that integrates the results of the different vendors along with internal domain-specific features (e.g., variables and attributes).

A need exists for improved techniques for generating rules for anomaly detection.

SUMMARY

In one embodiment, a method comprises obtaining anomaly analysis data integrated from a plurality of data sources of an organization, wherein the plurality of data sources comprises at least one set of labeled anomaly data related to anomalous transactions; extracting features from the integrated anomaly analysis data that correlate with an indication of an anomaly, based on predefined correlation criteria; training a plurality of machine learning models using the extracted features, wherein each of the plurality of machine learning models is trained using different combinations of the extracted features; evaluating a performance of the plurality of trained machine learning models; and extracting one or more rules from one or more of the trained machine learning models based on the performance, wherein the extracted one or more rules are used to classify transactions as anomalous.

In some embodiments, the trained machine learning models comprise a decision tree comprising paths to an anomaly classification having a predefined significance. In one or more embodiments, the extracted rules are in a human-readable format that can be configured and/or modified by a user.

Other illustrative embodiments include, without limitation, apparatus, systems, methods and computer program products comprising processor-readable storage media.

BRIEF DESCRIPTION OF THE DRAWINGS

FIG. 5 illustrates an exemplary set of feature groups extracted by the feature engineering stage of FIG. 2, according to at least one embodiment of the disclosure;

FIG. 8 illustrates an example rule of the extracted anomaly rules of FIG. 1, according to some embodiments;

DETAILED DESCRIPTION

Figure 1:
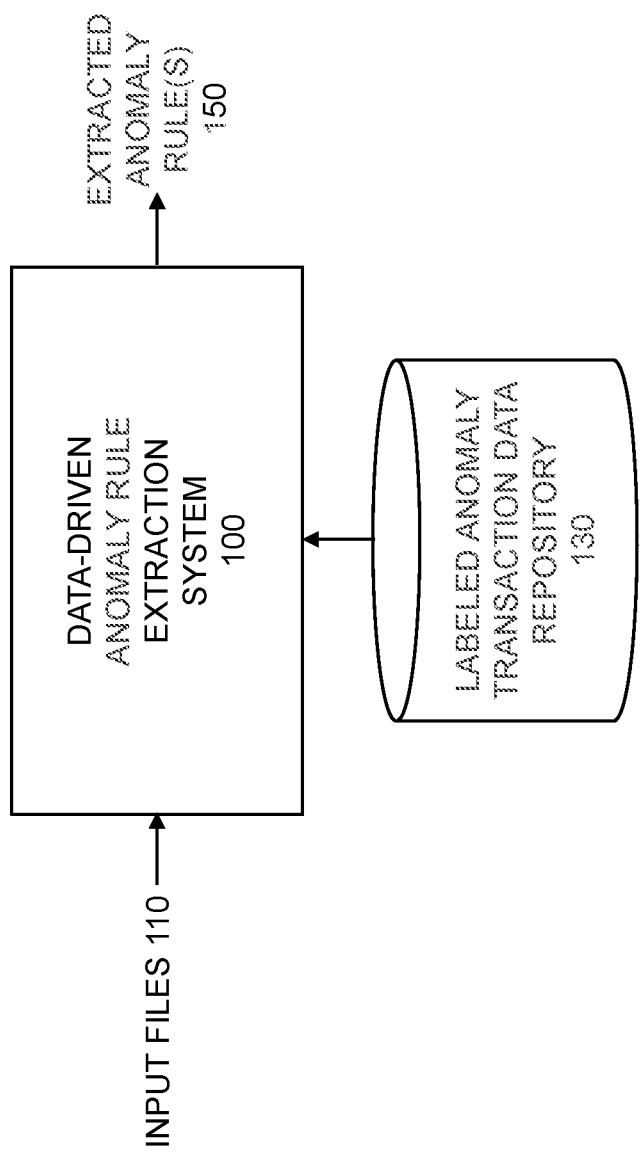
FIG. 1 illustrates an exemplary data-driven anomaly rule extraction system, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for extracting anomaly related rules from organizational data.

In one or more embodiments, the disclosed techniques for extracting anomaly related rules from data of an organization leverage data mining techniques and supervised machine learning techniques. The data mining techniques are used to integrate anomaly analysis data from multiple data sources of an organization and to extract features from the integrated anomaly analysis data. Multiple machine learning models are trained using the extracted features, and anomaly related rules are extracted from one or more of the trained machine learning models. The extracted anomaly related rules are used to classify transactions as anomalous, such as fraudulent transactions, or non-anomalous, such as legitimate transactions.

A fraud detection system protects organizations against fraud by preventing fraudulent transactions from occurring. It has been estimated that in 2017 there was an overall loss of $57M due to credit card losses and an overall loss of $141M due to fraudulent payment losses. See, e.g., Internet Crime Complaint Center (IC3) 2017 Internet Crime Report. As a result, many companies invest significant resources in efforts to prevent such frauds. One common mechanism for preventing fraud is to employ fraud analysts that analyze suspicious transactions and attempt to prevent the suspicious transactions from occurring, often in near real-time. Transactions are usually classified as a suspicious transaction based on an assigned risk score provided by one or more risk evaluation and/or fraud detection products, often from multiple vendors.

In large corporate entities, for example, a manually defined rule mechanism is often also employed that is based on expert knowledge that integrates the results of the different vendors along with internal features (e.g., variables and attributes) that are domain specific.

In one or more embodiments, the disclosed techniques for extracting anomaly related rules from organizational data fill the remaining gap between human defined rules and machine learning solutions. Machine learning approaches are typically precise in capturing certain frauds and other anomalies but they also have some drawbacks. For example, vendors typically do not provide business users with the ability to tune the underlying model, especially if using a complex model, such as deep neural network models. In addition, it is almost impossible to communicate and visualize why a certain transaction was classified as a fraudulent transaction unless the model is straightforward (which is usually not the case).

One or more embodiments of the present disclosure address these challenges by presenting a modular anomaly detection system, such as a fraud detection system, that leverages the organizational resources for extracting fraud related rule sets based on data mining and machine learning approaches. The extracted rule sets can be generated automatically, capturing complex patterns of frauds, without impairing the intelligibility of rules that are generated by human experts. The disclosed rule extraction techniques enable users that do not have expertise in machine learning to collaborate in the generation of the extracted rules so that the end result is more tailored to the customer. In addition, the disclosed rule extraction techniques can serve as a complementary product that completes anomaly-based approaches that are often used by organizations as black boxes.

Fraud analysts, for example, typically investigate suspicious e-commerce purchases, rejecting fraudulent transactions and accepting benign ones. Fraud analysts obtain the suspicious transactions from fraud detection systems, that typically route only transactions that are considered anomalous or that comply with predetermined rule sets. The present disclosure addresses problems related to the predetermined rule sets, as described further below.

There are two main approaches for extracting rule sets that detect potential frauds: manual extraction, and machine learning-based extraction. Each approach has its own strengths and drawbacks. A manual extraction of rules relies on business logic. These rules are very intelligible both for experts who define the manual rules and for analysts that use the manual rules. However, the manual rules require the valuable time of fraud experts, cannot be tuned frequently, and are limited to the human capacity to capture complex patterns.

Machine learning-based rules, on the other hand, can be generated automatically without human intervention, often capturing very complex fraud profiles. Machine learning-based rule extraction, however, usually relies on state-of-the-art extraction methods, such as deep neural networks, preventing an intermediate level user, for example, from tuning the underlying model parameters so that the model can be adjusted to a desired business scenario. Deep neural networks and Bayesian approaches, for example, can be precise in capturing frauds but they also require a tedious parameter tuning. In addition, whenever the business circumstances change, it is hard for non-experts to fine tune such models.

Many vendors provide solutions that generate risk scores for purchases. These vendors usually strive to provide a plug-and-play solution that is relevant for general cases (e.g., credit card frauds, identity stealing fraud, and chargeback fraud). While this approach is effective in gaining a large customer base in a relatively short time, the approach may not be suitable for unique scenarios that may appear in some companies. For example, in some organizations, fraud detection systems are based on models that were developed outside the organization without considering labeled frauds that exist within the organization and without leveraging unique features, such as transaction audit log structure and customer profiles.

One justification for using machine learning techniques for rule extraction is that rules can be updated by re-training the underlying machine learning model. Frequent updates, for example, help in decreasing concept drift issues. Concept drift is the case where the predictive performance of a machine learning model is degraded over time due to changes in the real world. The new trained model will usually provide an updated and better function that maps the features (e.g., credit score and demographics) to the transaction type (e.g., fraudulent transaction vs. non-fraudulent transaction). However, there are cases where the currently used features are no longer sufficient and new features should be considered for addition to the model so that the updated model captures the changing reality. As noted above, existing solutions often provide a black box approach, rather than a real capability for users to add their own features.

FIG. 1 illustrates an exemplary data-driven anomaly rule extraction system 100, according to an embodiment of the disclosure. As shown in FIG. 1, one or more input files 110 (e.g., purchase related data) are processed by the data-driven anomaly rule extraction system 100, along with labeled anomaly transaction data repository 130. As discussed further below in conjunction with FIGS. 2 and 4, transaction labels are gained from anomaly analysis datasets, for example, generated by a fraud detection system.

The exemplary data-driven anomaly rule extraction system 100 generates one or more extracted anomaly rule(s) 150, as discussed further below in conjunction with FIGS. 7 and 8, that are used to identify anomalies, such as fraudulent transactions.

Figure 2:
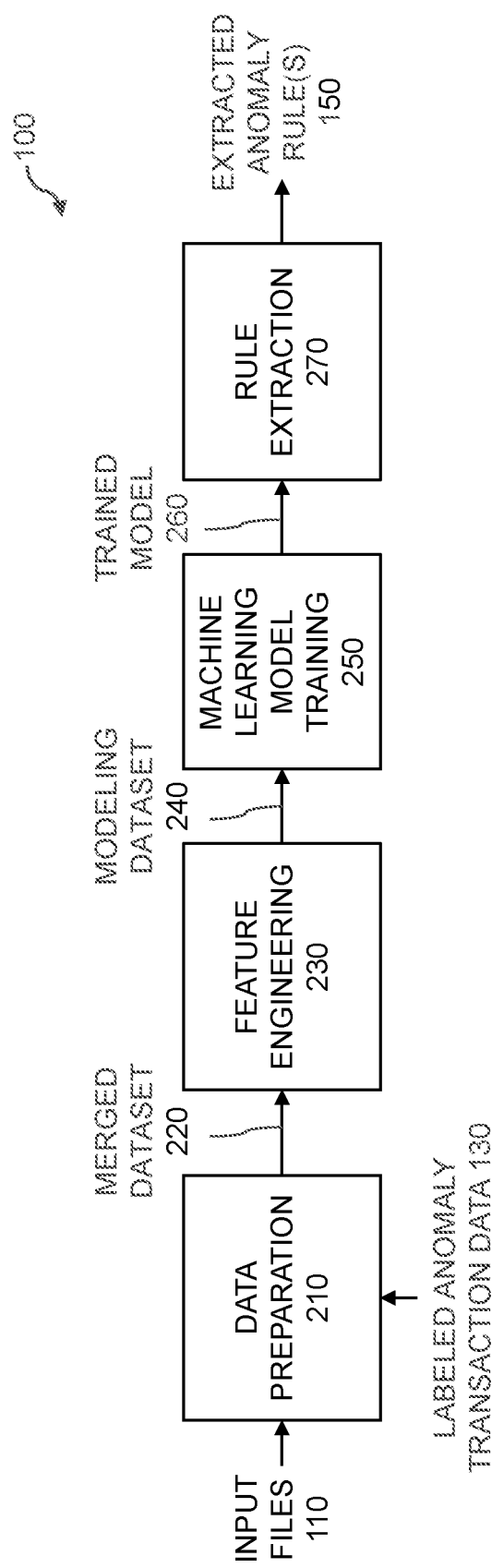
FIG. 2 illustrates the exemplary data-driven anomaly rule extraction system of FIG. 1 in further detail, according to at least one embodiment of the disclosure.

FIG. 2 illustrates the exemplary data-driven anomaly rule extraction system 100 of FIG. 1 in further detail, according to at least one embodiment of the disclosure. As shown in FIG. 2, the exemplary input files 110 and the labeled anomaly transaction data repository 130 are processed by a data preparation stage 210 that generates a merged dataset 220. In some embodiments, the data preparation stage 210 applies extract, transform, load (ETL) techniques where data is extracted from different sources and transformed to be suitable for a specific business case. Generally, ETL techniques comprise three database functions that are combined into a single tool to pull data out of one database and place it into another database. The data preparation stage 210 is discussed further below in conjunction with FIG. 4. The merging of multiple different datasets in the present content can be done based on, for example, a purchase primary key. The data preparation stage 210 optionally also includes a data cleansing function (e.g., excluding non-relevant or redundant rows and columns). For example, duplicate purchases, and purchases with many missing attributes (for example, purchases that do not contain contact information due to technical inconsistencies) can be excluded.

The merging of multiple data sources of an organization leverages organizational resources in the generation of the extracted anomaly rule(s) 150. In this manner, fraud experts collaborate in the analytical process from the starting point of determining which data assets might be relevant, through the exploration and engineering of fraud-related features and finally at the rule refinement, as described below.

The merged dataset 220 is processed by a feature engineering stage 230 that creates features for a modeling dataset 240 that are believed to be relevant for fraud classification based on domain knowledge. The exemplary feature engineering stage 230 is discussed further below in conjunction with FIGS. 4 and 5. Generally, the feature engineering stage 230 uses domain knowledge and data mining techniques to create features (e.g., variables) that allow machine learning algorithms to work. One or more engineered features, along with existing features (e.g., purchase revenue) are then used as the input vector [X] for modeling the fraud probability [Y]. In some embodiments, engineered features are intelligible and suitable for rule extraction. It is noted that the exemplary feature engineering stage 230 collects features that might be relevant for a specific business domain, as discussed further below.

The modeling dataset 240 (e.g., an input vector) is processed by a machine learning model training stage 250 that generates a trained model 260. The exemplary machine learning model training stage 250 trains one or more substantially optimized decision trees that model an anomaly probability, e.g., a fraud probability, based on a subset of the given input features (both original features and engineered features). As discussed further below in conjunction with FIG. 6, a model competition is applied and the substantially best decision tree is selected, for example, based on an F1 score. Generally, an F1 score is a harmonic average of precision and recall (e.g., true alarms and coverage rates). Each decision tree is trained with a different set of engineered features, where the exact combinations can be configured by a user.

In addition to feature combinations, in some embodiments, the exemplary machine learning model training stage 250 provides a mechanism to tune rule set properties, such as a number of minimal records per rule set (e.g., number of instances per leaf) and a number of maximal features per rule set (e.g., tree maximal depth) so that a non-expert user can tune the decision tree for the needs of a given organization.

Finally, a rule extraction stage 270 processes the trained model 260 to extract one or more extracted anomaly rule(s) 150, as discussed further below in conjunction with FIGS. 7 and 8. In one exemplary implementation, the machine learning models that are trained by stage 250 are implemented as decision trees, as discussed further below. Among other benefits, decision trees are an interpretable model. In addition, the parameters of a decision tree can be translated to business parameters. Thus, one or more aspects of the disclosure recognize that decision trees can be represented as hierarchically ordered rules. Thus, in one exemplary implementation, the rule extraction stage 270 processes the decision trees in the trained model 260 as an input and provide as an output all the paths to a fraud classification with a predetermined significance. For example, the user can configure this module to extract only leaves in which the fraud probability is higher than 60%. As the precision and significance increase, the potential coverage decreases. Hence, the user should be aware of its desired rules properties.

The extracted anomaly rule(s) 150 can be used, for example, to route transactions that fulfill one or more of the extracted anomaly rule(s) 150 to a fraud analyst and/or to perform knowledge extraction to assist the process of manual definition of rule sets.

Among other benefits, in some embodiments, the disclosed data-driven anomaly rule extraction system 100 is modular comprising modular implementations for one or more of the data preparation stage 210, feature engineering stage 230, machine learning model training stage 250 and the rule extraction stage 270. Thus, changing one modular process or module does not affect the other processes or modules.

In some embodiments, the extracted anomaly rule(s) 150 are in a human-readable format that can be configured and/or modified by a user. In this manner, non-experts can interact with the underlying trained model 260. Thus, fraud experts, for example, are able to understand and refine the extracted anomaly rule(s) 150.

Figure 3:
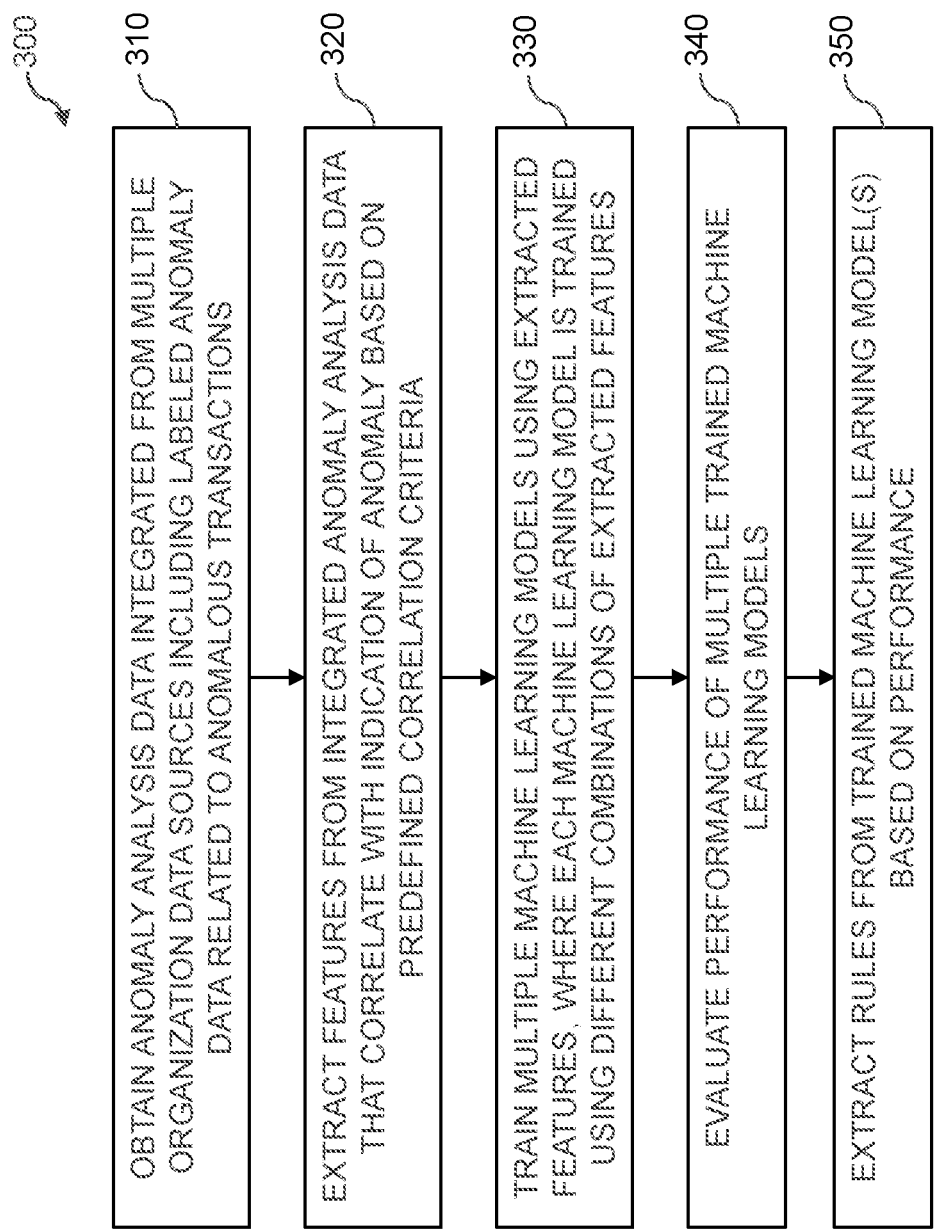
FIG. 3 is a flow chart illustrating an exemplary implementation of a data-driven anomaly rule extraction process, according to one embodiment.

FIG. 3 is a flow chart illustrating an exemplary implementation of a data-driven anomaly rule extraction process 300, according to one embodiment. As shown in FIG. 3, the exemplary data-driven anomaly rule extraction process 300 initially obtains anomaly analysis data integrated from multiple data sources of an organization, during step 310. The multiple data sources comprise at least one set of labeled anomaly data related to anomalous transactions.

Thereafter, the exemplary data-driven anomaly rule extraction process 300 extracts features from the integrated anomaly analysis data during step 320 that correlate with an indication of an anomaly, based on predefined correlation criteria (e.g., being identified as a feature by a domain expert).

The multiple machine learning models are trained during step 330 using the extracted features. Each machine learning model is trained using a different combination of the extracted features.

A performance of the multiple trained machine learning models are evaluated during step 340, and one or more rules are extracted from one or more of the trained machine learning models during step 350 based on the evaluated performance.

Figure 4:
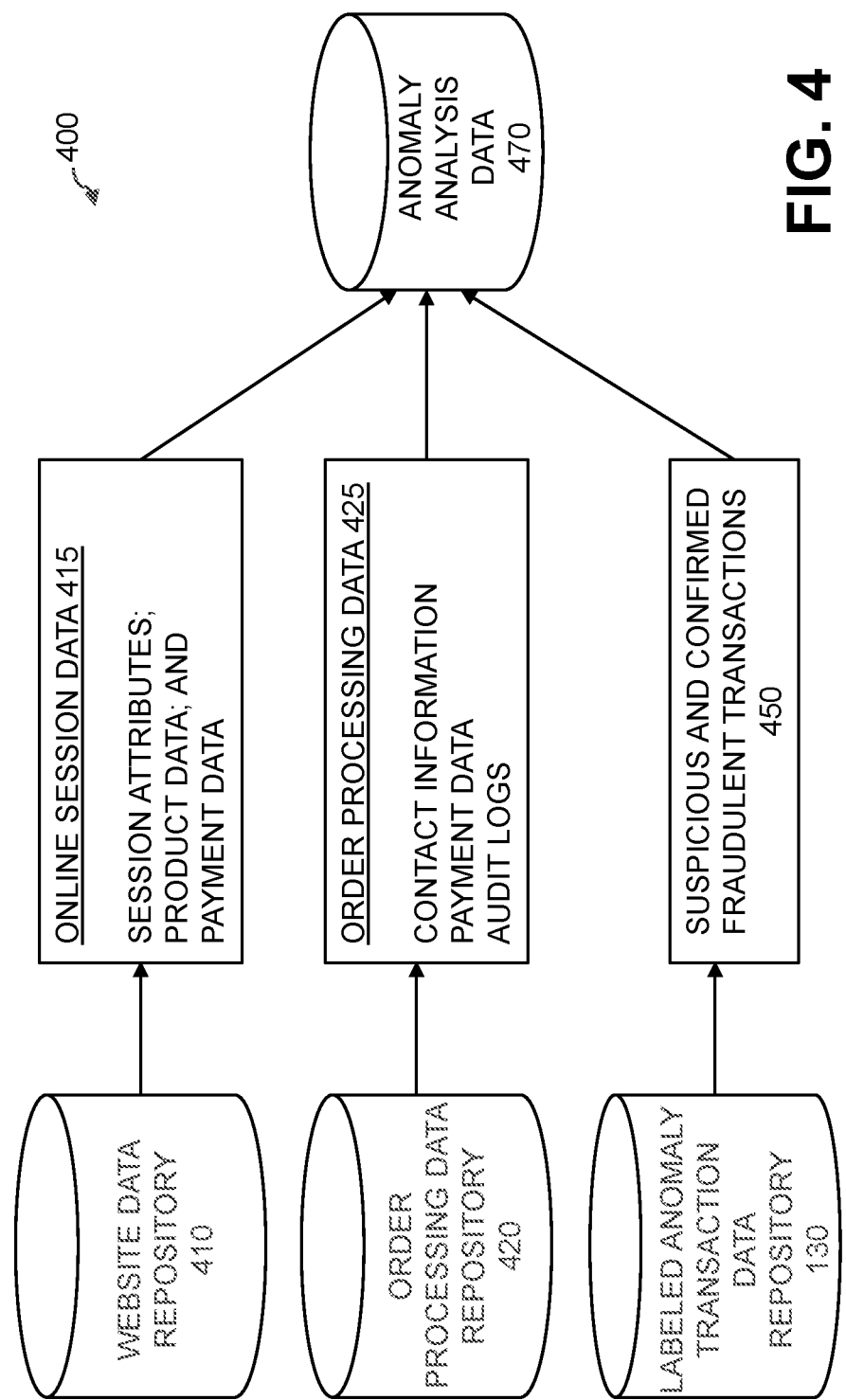
FIG. 4 illustrates an exemplary processing of multiple representative data sources of an organization to extract anomaly analysis data as part of the data preparation stage of FIG. 2, according to some embodiments.

FIG. 4 illustrates an exemplary processing 400 of multiple representative data sources of an organization to extract anomaly analysis data 470 as part of the data preparation stage 210 of FIG. 2, according to some embodiments. In the example of FIG. 4, data from a web site data repository 410, an order processing data repository 420 and a labeled anomaly transaction data repository 130 are processed to generate the anomaly analysis data 470.

As shown in FIG. 4, the website data repository 410 is processed to extract online session data 415, which may comprise, for example, session attributes (e.g., browser type, operating system and Internet Protocol (IP) address); product data (e.g., product name and/or product family); and/or payment (e.g., payment type and/or order amount)

In addition, the order processing data repository 420 is processed to extract order processing data 425, which may comprise, for example, contact information (e.g., email address and/or mailing address); payment (e.g., payment type and/or order amount); and audit logs.

The labeled anomaly transaction data repository 130 of FIG. 1 is also processed to extract suspicious and confirmed fraudulent transactions 450

FIG. 5 illustrates an exemplary set of feature groups 500 that are extracted by the feature engineering stage 230 of FIG. 2, according to at least one embodiment of the disclosure. As shown in FIG. 5, the exemplary set of feature groups 500 comprise contact information related features 510; online activity features 520; and order processing related features 530, each discussed hereinafter.

Generally, the feature engineering stage 230 uses domain knowledge and data mining techniques to create features (e.g., variables) that allow machine learning algorithms to work. In some embodiments, the extracted features should be suitable for rule extraction (e.g., understandable), and include original and engineered features. For a discussion of suitable techniques for generating engineered features, see, for example, U.S. patent application Ser. No. 16/038,370, filed Jul. 18, 2018, entitled "System Operational Analytics Using Additional Features for Health Score Computation," (now U.S. Pat. No. 11,151,014), incorporated by reference herein in its entirety.

The exemplary contact information related features 510 recognize that machine-generated emails are likely to be participants of a complex fraud attack, characterized by emails with several mutations and/or numerous digits; and domains and suffixes are more likely to be associated with fraudulent transactions.

For example, in one exemplary implementation, suitable contact information related features 510 comprise a suffix fraud probability; a domain fraud probability; a number of digits in email address; a number of punctuations in email address; a shipping and billing addresses alignment; and a number of billing addresses per shipment address.

The exemplary online activity features 520 consider a fraud rate with respect to a number of purchases or transactions and a visitor category (e.g., a one-time visitor vs. a multiple session customer); and a fraud rate per browser type and/or operating system. In one exemplary implementation, suitable online activity features 520 comprise a browser fraud probability; an operating system; an operating system fraud probability; a single occurrence as opposed to a reoccurrence of a visitor (e.g., identified by a visitor identifier); a number of purchases per session; and a number of email addresses per visitor identifier.

The exemplary order processing related features 530 consider an order amount; a number of payment fulfillments; and a product fraud probability. In one exemplary implementation, suitable order processing related features 530 comprise an order amount; a number of payment fulfillments; and a product fraud probability.

Figure 6:
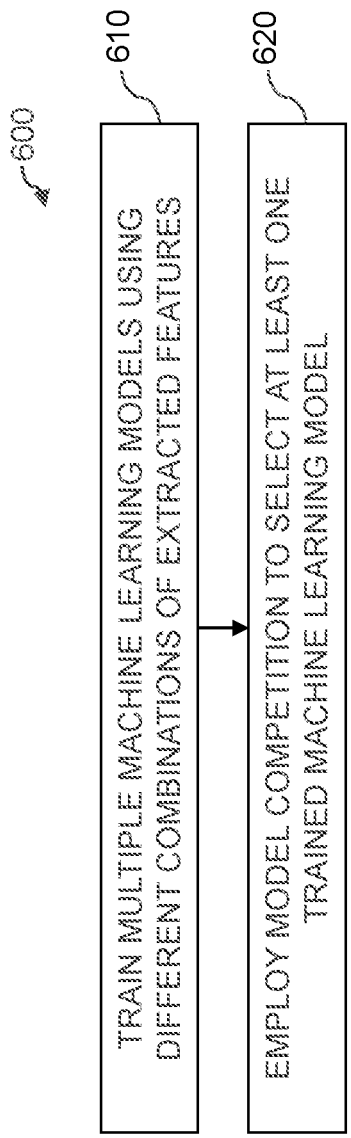
FIG. 6 is a flow chart illustrating an exemplary implementation of a machine learning model training process, according to one embodiment of the disclosure.

FIG. 6 is a flow chart illustrating an exemplary implementation of a machine learning model training process 600, according to one embodiment of the disclosure. As shown in FIG. 6, the exemplary machine learning model training process 600 initially trains multiple machine learning models during step 610 using different combinations of extracted features. For example, different types of machine learning models can be trained (such as Random Forest, XGBoost and/or Linear Regression machine learning models) that connect engineered features to outcomes (e.g., fraudulent transactions vs. non-fraudulent transactions).

In addition, during step 620, a model competition is employed to select at least one trained machine learning model, for example, based on an F1 score, as noted above. For example, for each trained machine learning model, the participated features can be ranked according to their importance, and then aggregate the ranked features.

Generally, the trained machine learning model can be trained to answer representative questions, such as which features are associated with fraudulent transactions and what rules can be extracted to mark suspicious transactions.

In a decision tree implementation, for example, during training each leaf can be defined, for example, to include at least 1000 instances and have a depth of at most 5 (e.g., there are at most 5 attributes at each rule set).

Since there are many legitimate transactions and few fraudulent transactions, the labels in the data can be imbalanced. In some embodiments, the label imbalance is addressed at the model level by testing different instance weights when testing different trees. Instance weights in decision trees are manifested through a weighted entropy calculation at each split. In this manner, a distribution of instances of at least one label in the anomaly analysis data is adjusted to address an imbalance of the at least one label.

Figure 7:
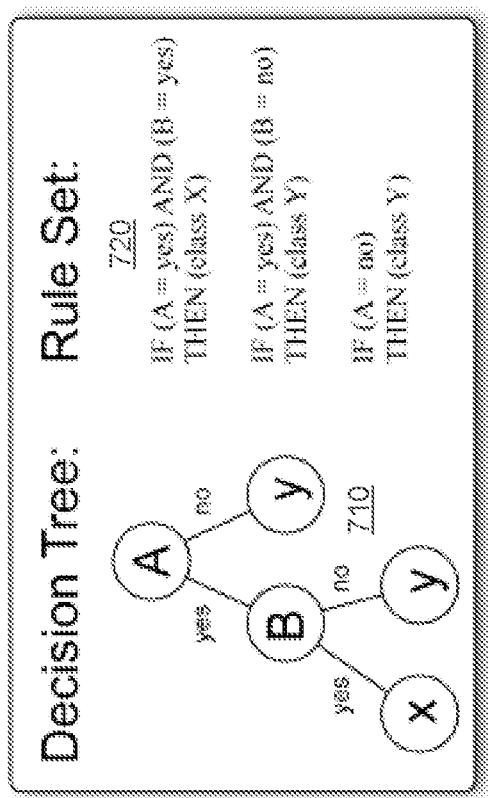
FIG. 7 illustrates an exemplary decision tree and a corresponding rule set extracted from the decision tree, according to an embodiment.

FIG. 7 illustrates an exemplary decision tree 710 and a corresponding rule set 720 extracted from the decision tree 710, according to one embodiment. Generally, the exemplary decision tree 710 is generated by the machine learning model training stage 250 of FIG. 2, as discussed above. One or more aspects of the present disclosure recognize that decision trees are a logical combination of rule sequences, trained by machine learning algorithms. The machine learning model training stage 250 trains a decision tree for classifying transactions as fraudulent as opposed to non-fraudulent transactions, and then extracts the generated rules.

The rule set 720 can be extracted from the decision tree 710 by identifying rules in the decision tree 710. In one exemplary implementation the features chosen by the decision tree 710 comprise a browser name, a product name, a billing domain, a session category and a visitor category (e.g., new vs. reoccurring visitors). Each leaf of the decision tree 710 is associated with a rule in the rule set 720. A given rule traverses the decision tree 710 from the root node to the corresponding leaf node.

As shown in FIG. 7, the rule set 720, extracted from decision tree 710, comprises the following rules:
If (A=yes) AND (B=yes), THEN (class X);
If (A=yes) AND (B=no), THEN (class Y); and
If (A=no), THEN (class Y).

Among other benefits, the user can configure the expected precision in the rule set 720 with a trade-off of its corresponding coverage level. The rule extraction stage 270 can be continuously or semi-continuously applied, such as on a daily, weekly, monthly basis as a micro-service, or at other intervals and/or times.

The presented solution enables the integration of other vendor results within the rule sets 720. For example, consider a given organization that uses one or more fraud detection systems that provide, for example, a personal information confidence score and a payment confidence score. The personal information confidence score and the payment confidence score of each solution can be integrated as a feature in the trained decision tree 710.

FIG. 8 illustrates an exemplary rule 800 that may be part of the extracted anomaly rule(s) 150 of FIG. 1, according to an embodiment. As shown in FIG. 8, the example rule 800 comprises the following components:
1. Browser is one of the following: ['Firefish', 'Marathon'];
2. Order Amount>624.5;
3. ProductName is one of the following: ['The Smalls 4-PC-Download', 'Tiny α6500 ILCE-6500-Digital camera-mirrorless-24.2 MP-APS-C-4K/30 fps-body only-Wi-Fi, NFC, Bluetooth', ToyStation 4 Dual 4 controller—Jet Black" etc. . . . ;
4. billing_domain is one of the following: ['billing domain A,' 'billing domain B', 'billing domain C', 'billing domain N']; and
5. There is more than one purchase in the associated session.

In a further variation, the final component can test whether the user is a single time visitor, as opposed to evaluating the number of purchases in the associated session.

In some embodiments, the disclosed techniques for extracting anomaly related rules from organizational data provide improved techniques for detecting anomalies.

Among other benefits, the disclosed techniques for extracting anomaly related rules consider multiple organizational data sources and employ multiple machine learning models.

One or more embodiments of the disclosure provide improved methods, apparatus and computer program products for extracting anomaly related rules from organizational data. The foregoing applications and associated embodiments should be considered as illustrative only, and numerous other embodiments can be configured using the techniques disclosed herein, in a wide variety of different applications.

It should also be understood that the disclosed techniques for extracting anomaly related rules, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for extracting anomaly related rules from organizational data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data-driven anomaly rule extraction system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data-driven anomaly rule extraction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
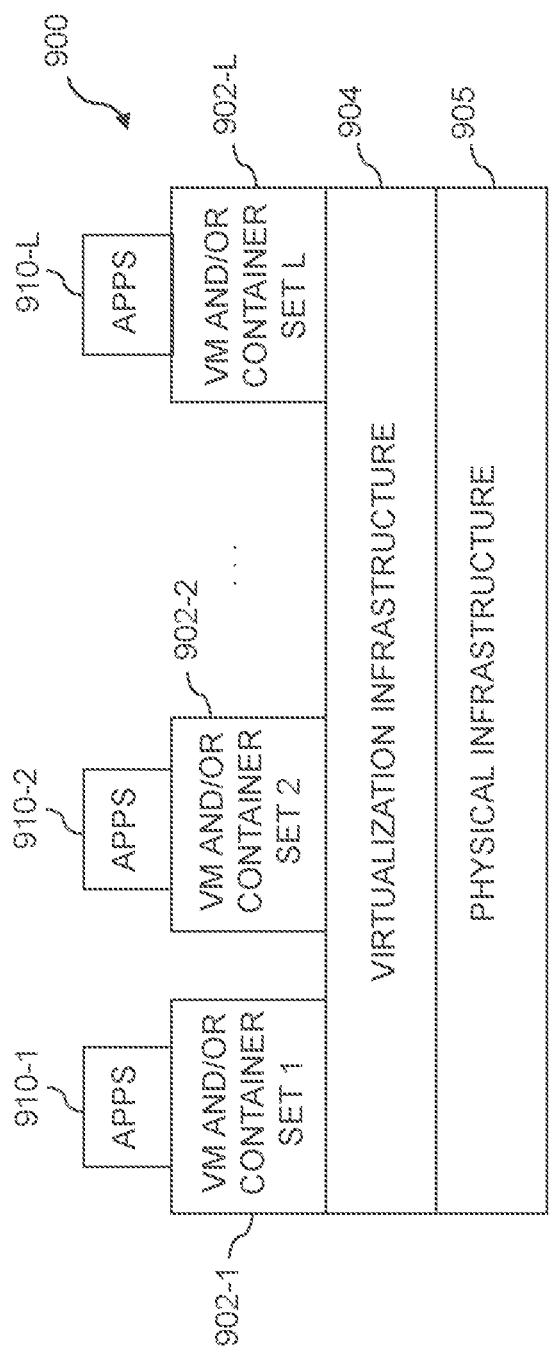
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the data-driven anomaly rule extraction system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide data-driven anomaly rule extraction functionality of the type described above for one or more processes running on a given one of the VMs. For example, each of the VMs can implement data-driven anomaly rule extraction control logic and associated machine learning model training functionality for providing trained machine learning models for extraction of one or more extracted anomaly rule(s) 150 for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide data-driven anomaly rule extraction functionality of the type described above for one or more processes running on different ones of the containers. For example, a container host device supporting multiple containers of one or more container sets can implement one or more instances of data-driven anomaly rule extraction control logic and associated machine learning model training functionality for providing trained machine learning models for extraction of one or more extracted anomaly rule(s) 150.

As is apparent from the above, one or more of the processing modules or other components of data-driven anomaly rule extraction system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
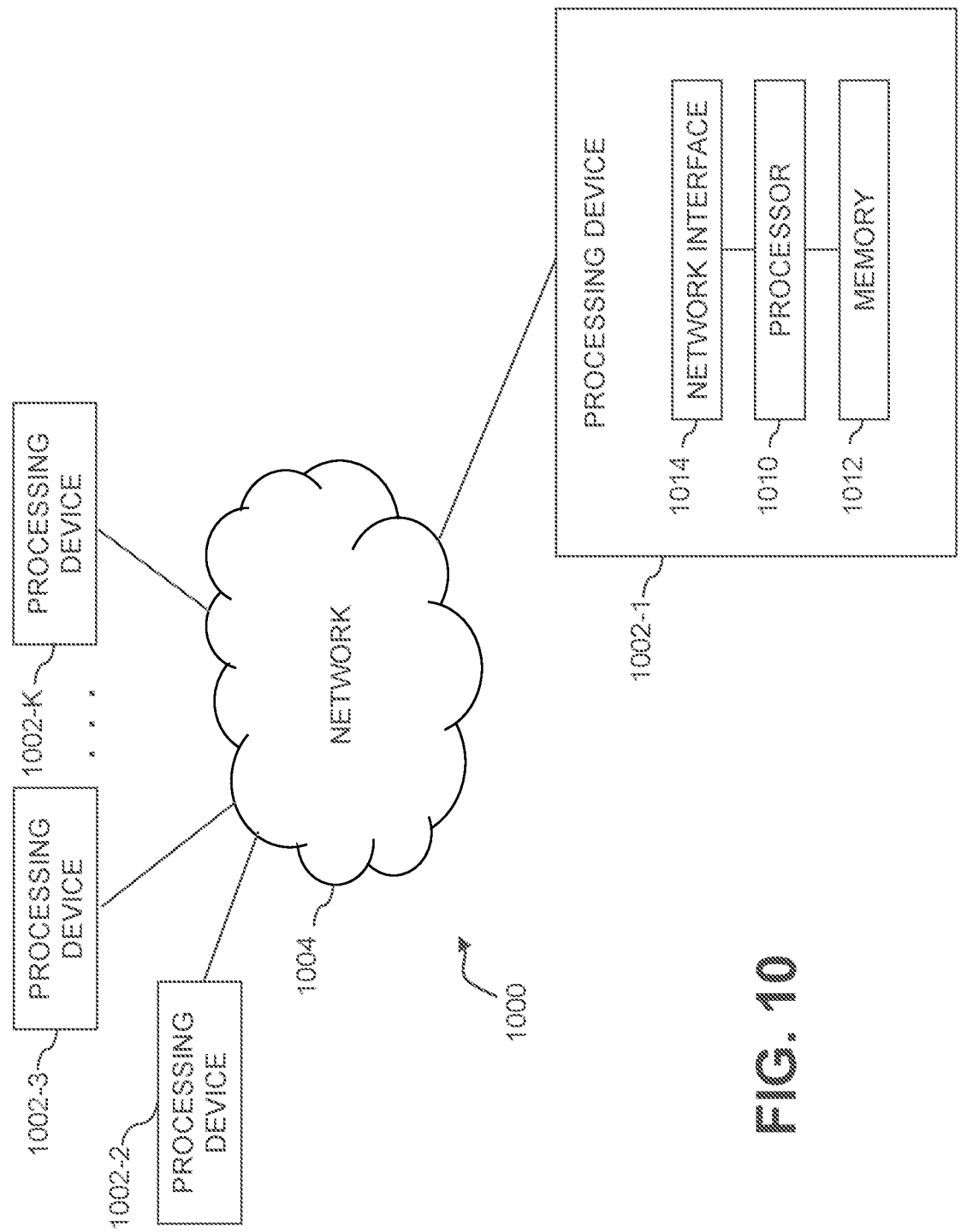
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
A method, comprising:
   obtaining anomaly analysis data integrated from a plurality of data sources of an organization, wherein the plurality of data sources comprises at least one set of labeled anomaly data comprising information related to transactions that have been labeled as anomalous transactions;

extracting features from the integrated anomaly analysis data that correlate with an indication of an anomaly, based on predefined correlation criteria;
initiating a training, using at least one processing device, of a plurality of machine learning models using the extracted features, wherein each of the plurality of machine learning models is trained using different combinations of the extracted features, wherein one or more of the trained machine learning models comprise at least one decision tree, wherein the at least one decision tree comprises a plurality of paths to an anomaly classification, wherein each path comprises a logical combination of conditions to a leaf node;
evaluating a performance of the plurality of trained machine learning models; and
extracting one or more rules from one or more of the trained machine learning models based on the performance, wherein the extracted one or more rules are used to classify transactions as anomalous, wherein each extracted rule is associated with a given leaf node of the at least one decision tree and is extracted by aggregating the conditions associated with at least some of the nodes in the at least one decision tree along the respective path to the given leaf node;
wherein the method is performed by at least one processing device comprising a processor coupled to a memory.

2. The method of claim 1, wherein an integration of the anomaly analysis data from the plurality of data sources of an organization comprises one or more of merging tables, removing irrelevant information and removing redundant information.

3. The method of claim 1, wherein the extracted features comprise at least one engineered feature relevant to anomaly classification based on domain knowledge.

4. The method of claim 1, wherein the extracted features comprise one or more of contact information features; online activity features and order processing features.

5. The method of claim 1, wherein the anomaly classification comprises a predefined significance.

6. The method of claim 1, wherein one or more properties of the extracted one or more rules are tunable by a user.

7. The method of claim 1, further comprising the step of adjusting a distribution of instances of at least one label in the anomaly analysis data to address an imbalance of the at least one label.

8. The method of claim 1, wherein one or more of the extracted rules are in a human-readable format for one or more of configuration and modification by a user.

9. A system, comprising:
a memory; and
at least one processing device, coupled to the memory, operative to implement the following steps:
obtaining anomaly analysis data integrated from a plurality of data sources of an organization, wherein the plurality of data sources comprises at least one set of labeled anomaly data comprising information related to transactions that have been labeled as anomalous transactions;
extracting features from the integrated anomaly analysis data that correlate with an indication of an anomaly, based on predefined correlation criteria;
initiating a training, using at least one processing device, of a plurality of machine learning models using the extracted features, wherein each of the plurality of machine learning models is trained using different combinations of the extracted features, wherein one or more of the trained machine learning models comprise at least one decision tree, wherein the at least one decision tree comprises a plurality of paths to an anomaly classification, wherein each path comprises a logical combination of conditions to a leaf node;
evaluating a performance of the plurality of trained machine learning models; and
extracting one or more rules from one or more of the trained machine learning models based on the performance, wherein the extracted one or more rules are used to classify transactions as anomalous, wherein each extracted rule is associated with a given leaf node of the at least one decision tree and is extracted by aggregating the conditions associated with at least some of the nodes in the at least one decision tree along the respective path to the given leaf node.

10. The system of claim 9, wherein an integration of the anomaly analysis data from the plurality of data sources of an organization comprises one or more of merging tables, removing irrelevant information and removing redundant information.

11. The system of claim 9, wherein the extracted features comprise at least one engineered feature relevant to anomaly classification based on domain knowledge.

12. The system of claim 9, wherein the anomaly classification comprises a predefined significance.

13. The system of claim 9, wherein one or more properties of the extracted one or more rules are tunable by a user.

14. The system of claim 9, wherein one or more of the extracted rules are in a human-readable format for one or more of configuration and modification by a user.

15. A computer program product, comprising a tangible machine-readable storage medium having encoded therein executable code of one or more software programs, wherein the one or more software programs when executed by at least one processing device perform the following steps:
obtaining anomaly analysis data integrated from a plurality of data sources of an organization, wherein the plurality of data sources comprises at least one set of labeled anomaly data comprising information related to transactions that have been labeled as anomalous transactions;
extracting features from the integrated anomaly analysis data that correlate with an indication of an anomaly, based on predefined correlation criteria;
initiating a training, using at least one processing device, of a plurality of machine learning models using the extracted features, wherein each of the plurality of machine learning models is trained using different combinations of the extracted features, wherein one or more of the trained machine learning models comprise at least one decision tree, wherein the at least one decision tree comprises a plurality of paths to an anomaly classification, wherein each path comprises a logical combination of conditions to a leaf node;
evaluating a performance of the plurality of trained machine learning models; and
extracting one or more rules from one or more of the trained machine learning models based on the performance, wherein the extracted one or more rules are used to classify transactions as anomalous, wherein each extracted rule is associated with a given leaf node of the at least one decision tree and is extracted by aggregating the conditions associated with at least some of the nodes in the at least one decision tree along the respective path to the given leaf node.

16. The computer program product of claim 15, wherein an integration of the anomaly analysis data from the plurality of data sources of an organization comprises one or more of merging tables, removing irrelevant information and removing redundant information.

17. The computer program product of claim 15, wherein the extracted features comprise at least one engineered feature relevant to anomaly classification based on domain knowledge.

18. The computer program product of claim 15, wherein the anomaly classification comprises a predefined significance.

19. The computer program product of claim 15, wherein one or more properties of the extracted one or more rules are tunable by a user.

20. The computer program product of claim 15, wherein one or more of the extracted rules are in a human-readable format for one or more of configuration and modification by a user.

* * * * *